United States Patent
Wattiau et al.

(10) Patent No.: US 12,192,384 B2
(45) Date of Patent: Jan. 7, 2025

(54) CONTEXTUAL AUTHORISATION

(71) Applicant: Hewlett-Packard Development Company, L.P., Spring, TX (US)

(72) Inventors: Gaetan Wattiau, Bristol (GB); Thalia May Laing, Bristol (GB); Joshua Serratelli Schiffman, Washington, DC (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 18/041,285

(22) PCT Filed: Aug. 21, 2020

(86) PCT No.: PCT/US2020/047458
§ 371 (c)(1),
(2) Date: Feb. 10, 2023

(87) PCT Pub. No.: WO2022/039756
PCT Pub. Date: Feb. 24, 2022

(65) Prior Publication Data
US 2023/0308299 A1 Sep. 28, 2023

(51) Int. Cl.
*H04L 9/32* (2006.01)
*H04L 9/30* (2006.01)

(52) U.S. Cl.
CPC .......... *H04L 9/3271* (2013.01); *H04L 9/3073* (2013.01); *H04L 9/3247* (2013.01)

(58) Field of Classification Search
CPC ..... H04L 9/085; H04L 9/3073; H04L 9/3234; H04L 9/3247; H04L 9/3271; G06F 21/31; G06F 21/316; G06F 21/34; G06F 21/40; G06F 2221/2103; G06F 2221/2111
See application file for complete search history.

(56) References Cited

U.S. PATENT DOCUMENTS

| | | | |
|---|---|---|---|
| 7,904,517 B2 | 3/2011 | Kang et al. | |
| 2009/0217368 A1 | 8/2009 | Buss et al. | |
| 2016/0004857 A1 | 1/2016 | Chen | |
| 2016/0180072 A1 | 6/2016 | Ligatti et al. | |
| 2017/0200202 A1 | 7/2017 | Yu et al. | |
| 2018/0278594 A1* | 9/2018 | Schiffman | H04L 9/0861 |

(Continued)

FOREIGN PATENT DOCUMENTS

| | | |
|---|---|---|
| WO | 2017/158376 A1 | 9/2017 |
| WO | 2018/069566 A1 | 4/2018 |

*Primary Examiner* — Minh Dinh
(74) *Attorney, Agent, or Firm* — Knobbe, Martens, Olson & Bear, LLP (57) ABSTRACT

A system, comprising an authentication module to generate a challenge to authenticate a user, the challenge to be distributed to members of a set of verifying parties; and grant the user access to a resource upon receiving an authenticating response to the challenge; and a combiner module to receive partial responses from members of the set of verifying parties upon verification of the user by each member, the verification made using a provided contextual identifier of the user; based on the partial responses reaching a threshold number of responses, combine the partial responses to obtain a combined response, and provide the combined response to the authentication module as an authenticating response to the challenge.

15 Claims, 7 Drawing Sheets

(56) References Cited

U.S. PATENT DOCUMENTS

| | | |
|---|---|---|
| 2019/0057199 A1 | 2/2019 | Hutchinson |
| 2019/0116180 A1* | 4/2019 | Teranishi ................ G06F 21/32 |
| 2020/0117776 A1 | 4/2020 | De Souza et al. |
| 2020/0412528 A1* | 12/2020 | Saint ................... H04W 12/068 |
| 2022/0038442 A1* | 2/2022 | Lev ........................ G06F 21/31 |

* cited by examiner

CONTEXTUAL AUTHORISATION

BACKGROUND

Managing client authorisation may involve, for example, verifying that a client is authorised to access a particular service from a service provider. This may be achieved, by issuing the client with an authorisation to indicate that the client is authorised.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A user may wish to access some service or functionality from a provider, and the user may be able to access to the desired service or functionality after providing an authorisation from a client device to the provider to indicate that the user is allowed/permitted to have access. For example, the client device may provide some identification to prove they are who they say they are, before being issued with authorisation to access the service/functionality. Such authorisation may be used, for example, to check that a user has paid, or had a valid licence, to access a particular pay-to-access/licenced service, or to check that the user has the required security clearance or status to access particular data or functionality of an application.

A user may provide some data to demonstrate that they are the expected user before being granted authorisation. For example, a public key cryptography protocol, such as using a smart card, may be used to authenticate a user. A private key is stored on a device (such as a smart card, hardware token, phone, or laptop). When a user wishes to authenticate itself to a relying party (RP), the RP generates a challenge that is sent to the user, and the user uses the device (e.g. smartcard) to sign the challenge using the private key. The private key emits/provides a cryptographic proof of the user's identity.

If the user is required to share sensitive or personal/private data and the data is intercepted by an attacker, the attacker may obtain the user's data, which is undesirable. Further, if the data is intercepted by an attacker and used to obtain access to the service/functionality available at the provider, the provider cannot tell if the data is being provided by the authorised user or by an attacker.

Certain examples disclosed herein may address the challenge of reducing the amount of personal or sensitive user data being held or transmitted to a particular entity to help preserve the user's privacy by reducing the amount of personal data held by a particular entity. Certain examples may make it more difficult for an attacker to obtain a user's personal data. Certain examples disclosed herein may address the challenge of ensuring that personal or private data provided as part of an authentication process is indeed provided by the authorised user and not by an attacker who has intercepted the data. Certain examples may allow a user flexibility in providing authentication credentials, so for example, if the user has misplaced a smartcard to be used as a proof of identity, the user may be able to provide one or more other credentials to demonstrate they are authorised.

Examples disclosed herein may allow for augmented user authentication, in which contextual authentication is provided by a user. Contextual authentication provides an indication of a user's context (e.g. the user's use habits, environment, and/or identifiers of the user) so that a service provider/authenticating party/relying party (RP) can match up the context of a user requesting authorisation with the context expected for the authorised user. For example, a user's connection pattern/profile may include a user's geo-location, IP address, time of access, and/or device identifiers as the user's context, which can be compared with expected contextual identifiers to strengthen verification of the identity of the user, and detect anomalous patterns which may correspond to an attacker attempting to authenticate with stolen credentials. Thus examples disclosed herein may provide more resilient and stronger authentication compared with non-contextual user authentication.

For a user to provide their current context/contextual identifier, the user may be required to share a lot of information about themselves to a RP or authentication party, and the data may be privacy sensitive. Examples disclosed herein may allow the user to provide their contextual identifiers in a way which reduces the amount of contextual data available or provided to a single receiving entity, i.e. so that an attacker cannot obtain all the provided contextual information by accessing a single entity or intercepting a single data channel. This goal may be achieved by having several RPs; however, in such an example each RP would need to implement a contextual authentication protocol and the user would need to share that information with each of the RPs, which causes a processing burden. Further, if the authentication policy is set at the RP side, the user may lack visibility about the actual authentication policy and may have no control on its enforcement.

Examples disclosed herein provide methods to allow users to use their context (e.g. IP address, geolocation) to help authenticate themselves without revealing all their context to a single relying party (RP). This may be achieved by leveraging threshold cryptography, that allows a signing key to be separated into multiple shares, such that a threshold of shareholders (verifying parties) can collaborate to provide a valid response, such as a signature. Examples disclosed herein may provide privacy-preserving contextual authentication by distributing shares of a signing key that authenticates the user to third parties that are trusted to verify the user context. Examples may be considered to be privacy-preserving in the sense that no single third-party is trusted with all the user information.

Disclosed herein is a system, comprising: an authentication module to: generate a challenge to authenticate a user, the challenge to be distributed to members of a set of verifying parties; and grant the user access to a resource upon receiving an authenticating response to the challenge; and a combiner module to: receive partial responses from members of the set of verifying parties upon verification of the user by each member, the verification made using a provided contextual identifier of the user; based on the partial responses reaching a threshold number of responses, combine the partial responses to obtain a combined response, and provide the combined response to the authentication module as an authenticating response to the challenge.

By leveraging a secret sharing scheme to distribute the signature capability to several verifying devices (shareholders), the risk of theft or compromise of the private key may be reduced compared to a system which does not use secret sharing to share/distribute a private key for signing a request. In some examples, the user may choose how the signing capability (i.e. how the private key is split and shared) is shared among the shareholders, such that different combinations (chosen by the user) of the shareholders may be used to collaborate and provide a valid signature.

Figure 1:
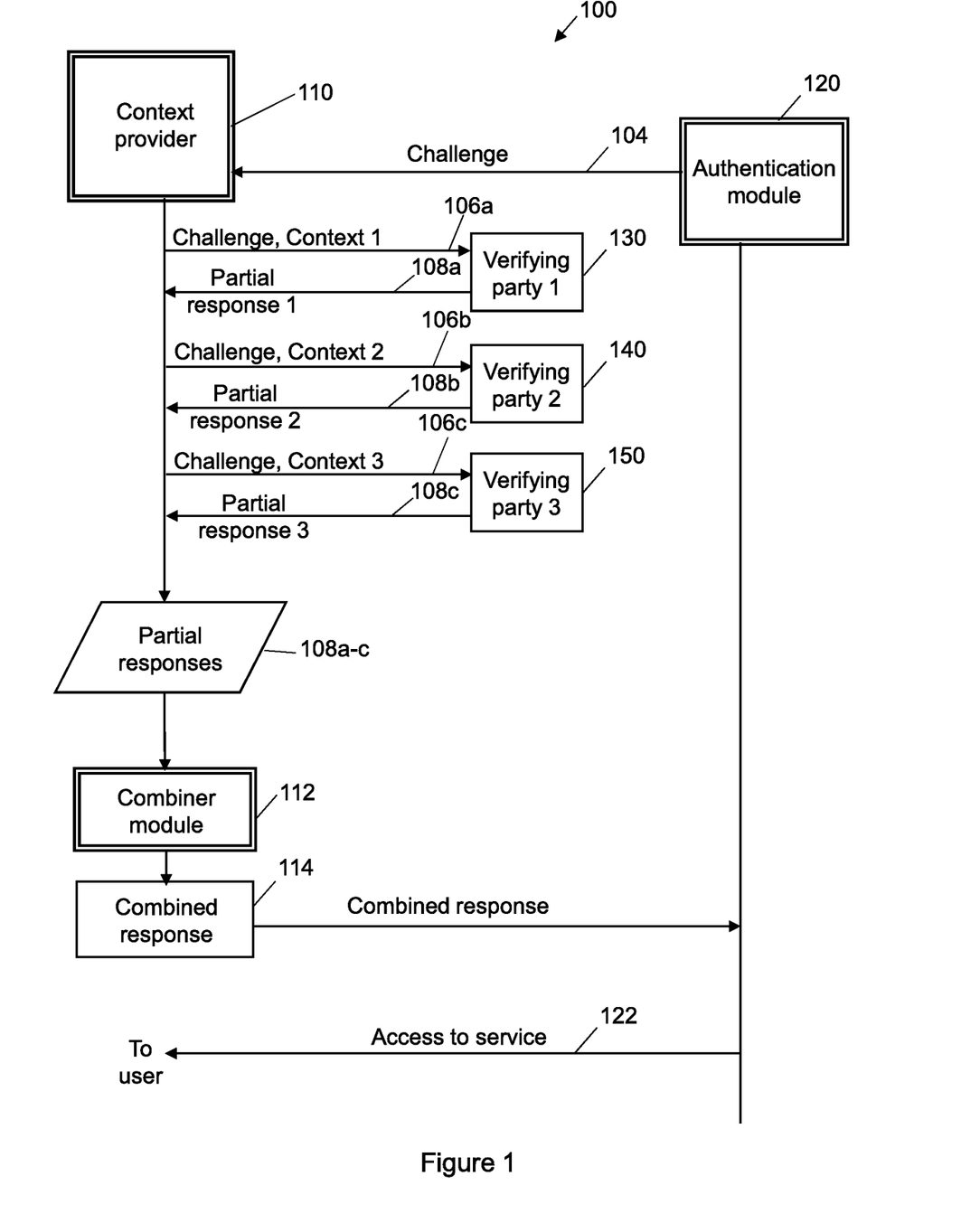
FIG. 1 shows a schematic representation of a contextual authorisation system according to an example of the disclosure.

FIG. 1 shows a schematic representation of an example of a contextual authorisation system 100. A context provider 110, an authentication module 120, and a plurality of verifying parties 130, 140, 150 are present. A user may request access to a service or functionality provided by a provider. To do this, the user initiates authentication to the authentication module 120 (e.g. a relying party). The user may be running client software, for example in a web browser, on a user device, and request authentication through the software.

Upon receiving the request for access from a user device, the authentication module 120 is to generate a challenge 104 to authenticate the user. The challenge 104 is received by the context provider 110 in this example. The context provider 110 may be part of the user device in some examples, and may be software e.g. the software through which the user requested authentication, in some examples.

The context provider module 110 in this example is to distribute the challenge 104 to members of a set of verifying parties 130, 140, 150 (i.e. to the shareholders). In this example, three verifying parties are illustrated but in other examples there may be two, or more than three, verifying parties. In some examples, there may be a plurality of verifying parties and a subset of the plurality are used in the user authentication process.

The context provider module 110 in this example is to provide a contextual identifier 106a, 106b, 106c of the user to each of the members of the set of verifying parties 130, 140, 150. For example, a contextual identifier may be a hardware token identifier 106a, and may be received by a hardware token verifying party 130; a user device hardware identifier 106b may be received by a user device hardware identifier verification party 140; and a user device geolocation 106c may be received by a geolocation verifying party 150. Other examples of contextual identifiers which may be provided to corresponding verifying parties include a spoofable user identifier, a user device IP address, a behaviour identifier such as a time of day or time window, and/or a day, at which the user is expected to submit an authentication request (e.g. the user may usually request access to a service between 8:30 am and 9 am every Monday to Thursday), and a frequency of authentication request for the user (e.g. the user may usually request access more than twice a day but less than five times a day. A geolocation may also be considered to be a behaviour identifier (e.g. the user is usually located in a particular town, or within a particular distance of a particular geo-coordinate (e.g. where the user's house or office is located), when requesting access).

The set of verifying parties 130, 140, 150 is to receive the challenge 106a, 106b, 106c and respective provided contexts. Each verifying party 130, 140, 150 is to compare the contextual identifier received with a corresponding stored context of the user. For example, the verifying party may access a log of previous user locations at which the user was located when requesting access, and compare a received current user geolocation provided as a contextual identifier with the logged previous locations.

In an example, a user may have a phone but no other hardware token (e.g. a smartcard). The context provider may use the phone hardware context "P" to generate a partial "hardware-context" response, and may also send a plurality of service-based contexts to respective service verifying parties; for example, the user's geolocation "geo" may be sent to a geographical location verifier "G"; a device identifier "id" may be sent to a device identification service "D", and the user's IP address "ip" may be sent to a IP address verifying service "I". The shareholders G, D and I then each emit a partial signature on the challenge. In this example, G checks "geo", emits a partial signature on the user challenge, and sends it back to the context provider; D checks "id", emits a partial signature on the user challenge and sends it back to the context provider, and I checks "ip", emits a partial signature on the user challenge and sends it back to the context provider. The user uses their phone P to also emit a partial signature on the user challenge.

Based on the received contextual identifier matching an associated stored user context, each verifying party provides the corresponding partial response 108a, 108b, 108c to the combiner module 112. The combiner module 112 in this example is thus to receive the partial responses 108a-c from members of the set of verifying parties 130, 140, 150 upon verification of the user by the member 130, 140, 150 using the received contextual identifier 106a-c.

If there are enough partial responses (in some examples, according to the combination set up by the user) the partial responses can be combined into a valid response. That is, based on the partial responses 108a-c reaching a threshold number of responses, the combiner module 112 is to combine the partial responses 108a-c to obtain a combined response 114.

The response is sent to the authentication module, which may then verify it with the corresponding public key. The combiner module 112 is to provide the combined response 114 to the authentication module 120 as an authenticating response to the challenge 104. The combiner may be an untrusted party in some examples as discussed in relation to FIG. 2.

Thus, threshold cryptography is used, so that the combiner module will not provide a combined response unless a threshold number of responses are received. Threshold cryptography in this example shares the responsibility of providing the authenticating response between a plurality of verifying parties. Using their share of authenticating functionality, each verifying party can emit a partial share of an authenticating response (e.g. a partially decrypted authenticating response), or a partial share of data allowing the authenticating response to be obtained (e.g. a signature share). Combining a threshold number of the partial responses from the verifying parties allows the authenticating response to be obtained. The authentication module 120 is to grant the user access to a resource upon receiving the authenticating response 114 to the challenge 104.

A partial response in some examples may be a partly decrypted authorised response, and the combiner module 112 may be to combine the plurality of received partly decrypted authorised responses to obtain an authorised response to demonstrate the user is authorised.

A partial response in some examples may be a partial signature, and the combiner module 112 may be to combine the plurality of received partial signatures to obtain a combined signature with which to sign the challenge provided by the authentication module to demonstrate the user is authorised.

In this example, the set of verifying parties 130, 140, 150 are separate from the authentication module 120. In such examples, none of the verifying parties can provide the response alone, and the authentication module does not directly receive the user's context, thereby providing privacy for the user as their contextual information is not all provided to a single entity.

Figure 2:
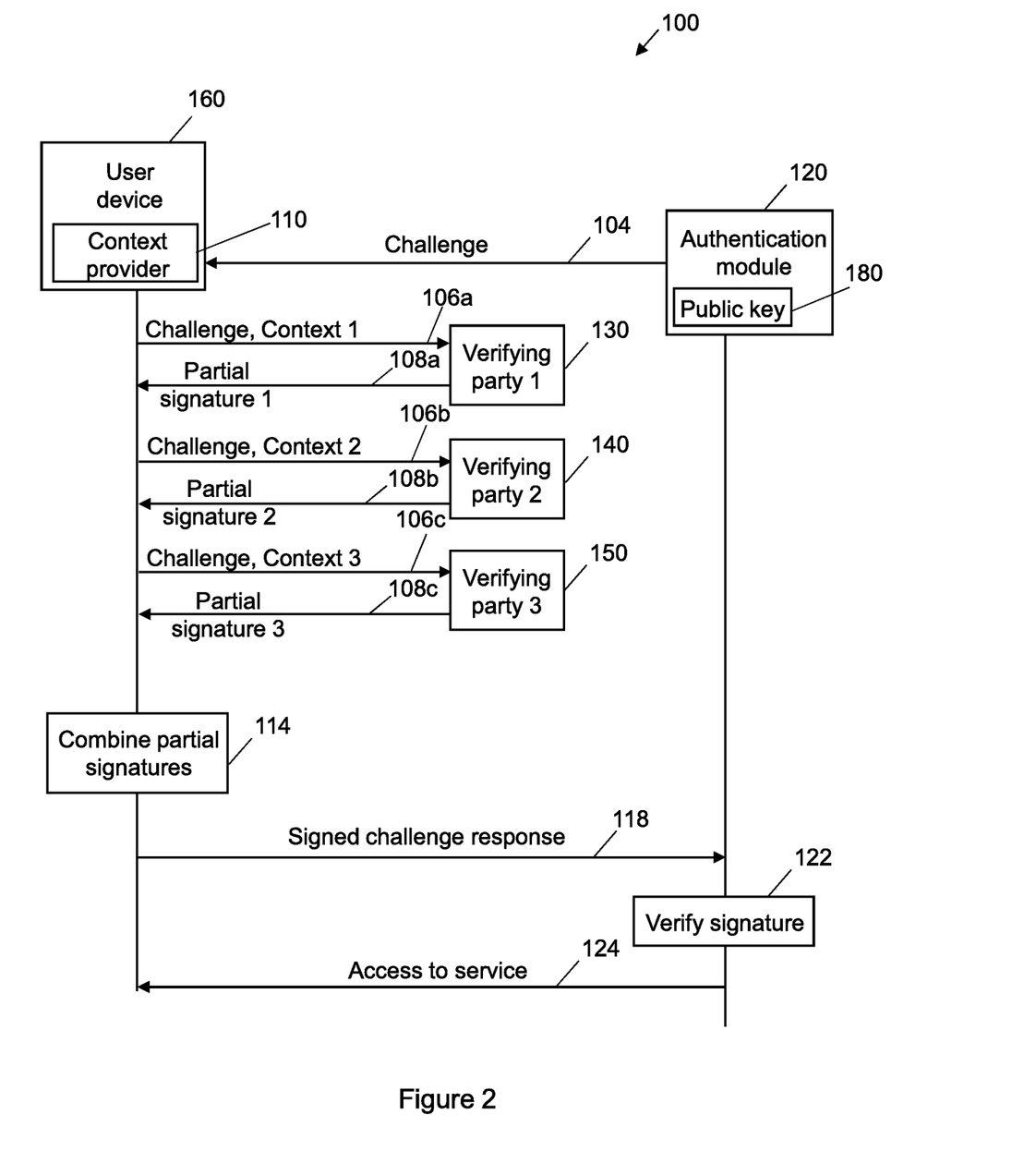
FIG. 2 illustrates a schematic representation of a contextual authorisation system according to an example of the disclosure.

FIG. 2 illustrates a schematic representation of a contextual authorisation system. Features in common with FIG. 1 are not discussed again in detail. In the example of FIG. 2, the context provider module 110 is part of the user device 160 being used to request access to the service/functionality. Also in this example, the partial responses provided by the verifying parties 130, 140, 150 are partial signatures.

This example leverages a public key authentication protocol, where a private key is used to sign a challenge 104 chosen by the RP (an authentication module) 120, and the signed challenge 118 is verified by the RP 120 which holds the corresponding public key 180. In this example, shares of the private key are distributively held by the verifying parties 130, 140, 150 so that each party holds one share, or a partial portion of all shares, of the private key. This example leverages threshold cryptography to share that private key into multiple shares and distribute the shares to the verifying third parties 130, 140, 150 which are trusted to verify some (but not necessarily all) user context, according to an authentication policy. Using their share, the third parties 130, 140, 150 can emit a signature share 108*a-c* (i.e. a partial signature) over the challenge 104 if the user context 106*a-c* is not unusual. If enough partial signatures 108*a-c* are emitted, they can be combined 114 into a valid signature, which is a result of the sign operation on the challenge (i.e. the output of the combination is the signature on the challenge). The signed challenge is sent to and verified by 122 the authentication module 120. The user may then receive access to the requested service 124.

In this example, the combiner module is part of the user device 160 of the user requesting authentication, so the user device 160, acting as a combiner, is to combine the partial signatures 114 and sign the challenge to access the requested service. In other examples, the combiner module may be remote from the user/requesting device 160. In some examples the combiner module may be an untrusted combiner module, or may be part of an untrusted third party which is separate from the user device 160, the set of verifying parties and the authentication module. That is, combination does not necessarily have to be done by the user device 160 or the context provider 110, but may be done by an untrusted third party (UTP). In such examples, the UTP does not learn anything except for the number of partial signatures, and the UTP cannot forge signatures, which helps preserve the privacy of the user by not disclosing the user's contextual identifiers to a combining party.

Figure 3:
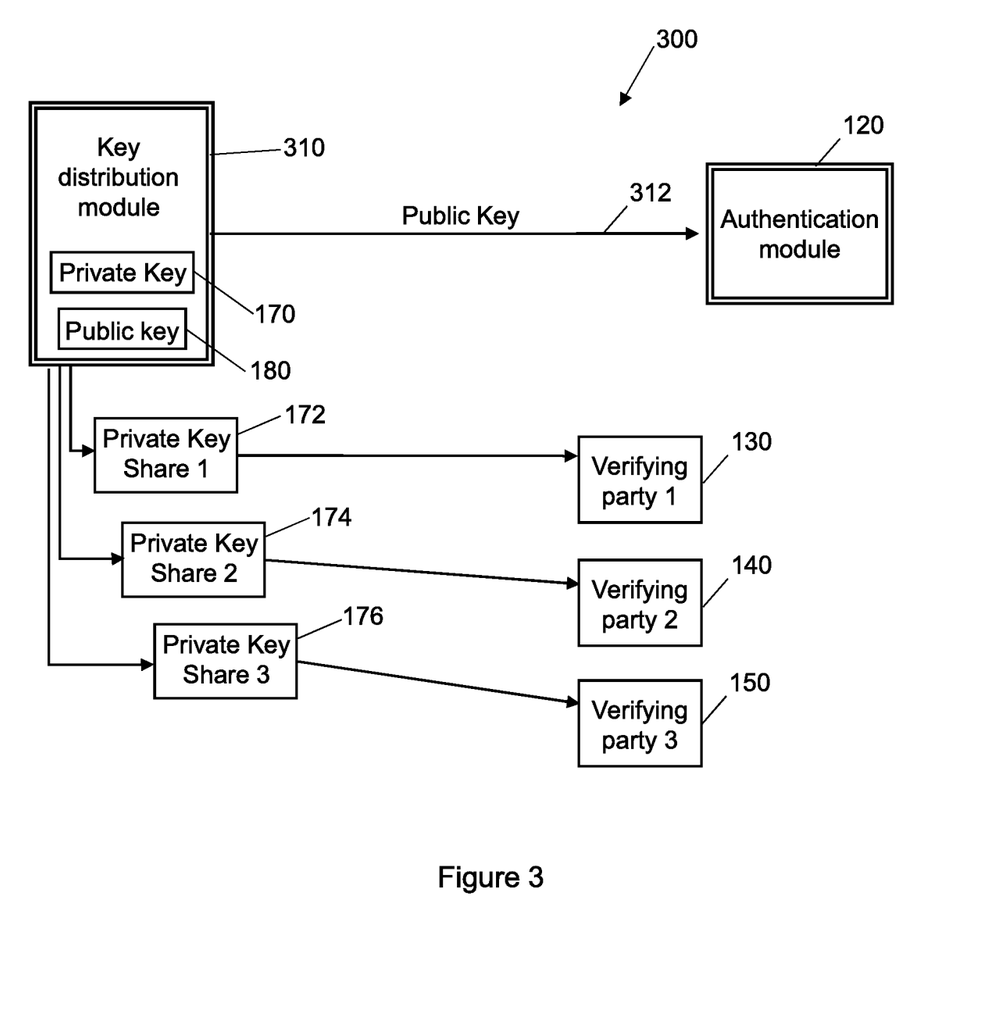
FIG. 3 shows a schematic representation of distributing a private key according to an example of the disclosure.

FIG. 3 shows a schematic representation of a system 300 to distribute a private key. A key distribution module 310 is shown, and has generated a paired public key 180 and private key 170 in association with a user. The key distribution module 310 provides the public key 312 to the authentication module. The key distribution module 310 is to split the private key 170 into a set of shares, shown as private key share 1 172, private key share 2 174 and private key share 3 176. In other examples there may be two, or more than three, shares of the private key. The key distribution module 310 is to distribute members of the set of shares 172, 174, 176 to the set of verification parties 130, 140, 150. A share 172, 174, 176 is to be used by a verification party 130, 140, 150 to generate the partial response upon verification of the user by the verifying party using the received contextual identifier. That is, once the verifying party 130, 140, 150 receives a contextual identifier from the user, and verifies that the contextual identifier is as expected for that user, the verifying party uses its share of the private key 172, 174, 176 to provide a partial response (e.g. a partial signature for use in signing the challenge issues to the user, or a partially decrypted response).

In some examples, during set-up of the system, the user 160 may choose the combination of shareholders 130, 140, 150 that can emit/provide a valid response (e.g. valid signature) 114. The private key 170 would be generated and shared among the shareholders 130, 140, 150 according to the combination chosen. The distribution of partial private keys 172, 174, 176 may be done in a central way with a dealer 310 that generates the key 170 and distributes it in shares 172, 174, 176 in some examples, as shown in FIG. 3.

For example, the user 160 may be able to choose an authentication policy that considers context (and in some examples, one or more other factors of the user's choice). The user may be able to authenticate, (by obtaining a valid combined response e.g. a valid signature to sign the challenge) if they can provide, for example, to the verifying parties:

a) a hardware token (T) AND a phone (hardware) (P); or
b) a hardware token OR a phone, if:
   i) the user's geolocation is not unusual as verified by service G; and
   ii) the user's device ID is not unusual as verified by service D; and
   iii) the user device's IP address is not unusual as verified by service I.

After generation of the response shares, the shares may be distributed between the verifying parties according to the authentication policy chosen by the user. For example, for the policy example above, we distribute the shares such that at least T and P, or (T or P, plus G and D and I) (in another notation, if $(T \wedge P) \vee ((T \vee P) \wedge (G \wedge D \wedge I))$ can construct a valid signature.

In some examples, the distribution of partial private keys 172, 174, 176 may be done in a decentralized way, where the shareholders 130, 140, 150 collaborate to generate the private key 170 and share the private key shares 175, 174, 176 out. In this way, no one entity learns the private key. Verification keys may also be generated in some examples, to verify the partial signatures 108*a-c* emitted by each shareholder 130, 140, 150. The corresponding public key 180 is sent to the RP/authentication module 120 which the user wishes to register to and to authenticate to in the future.

The combined response obtained by combining the partial responses issued by the verifying parties 130, 140, 150 may be considered to be a message that would be produced by signing the challenge with the distributed private key, either through being a complete signature used to sign the challenge, or through being a sufficiently decrypted challenge response. In other words, the response obtained from combining the partial responses is a response as sufficient for responding to the issued challenge as the response obtained as a single response (i.e. if no threshold sharing was used). In some examples the combined response may be the same as the response obtained as a single response without using threshold sharing.

In some examples, appropriately weighted shares may be distributed to the different verifying parties (e.g. following the example above, weighted shares of the private key may be distributed to a hardware token verification module (the Token T), a phone hardware verification module (the Phone P) and different services/modules in charge of verifying the Geolocation G (a geolocation service or a geolocation verification module), the Device ID D (as a spoofable user device identifier, for example to be verified by a device identifier verification service or a device identifier verification module) or the IP address I (device IP verification service or a device IP verification module). The phone identity P may be considered to be a share of the private key stored on a user's phone (the user's device) that can be used to authenticate that the user owns the phone and may be considered a type of hardware token. The device identifier D may be considered to be a spoofable identifier (i.e. there is no underlying secret), such as a universally unique identifier (UUID), which may be sent to a verifying party which has a list of UUID's commonly used by that user.

Some examples of verifying parties (such as a geolocation module or service G, a device ID module or service D and a device IP address module or service I) may be independent from RP, and may thus be in charge of protecting the privacy of the data the user trusts them with (namely geolocation, device ID, and IP address in this example). In this way, the system may be considered to preserve the user's privacy, since the data provided to the trusted verifying parties does not have to be provided to the RP to receive the contextually-verified authentication service. Services G, D and I may, in some examples, be provided by online platforms but in some examples may be provided by local devices. For example, G may be a local device (and in some examples may be the user device) with a GPS chip, or a log of common/historical user locations that emits a partial signature when the user's geolocation data is not unusual.

Figure 4:
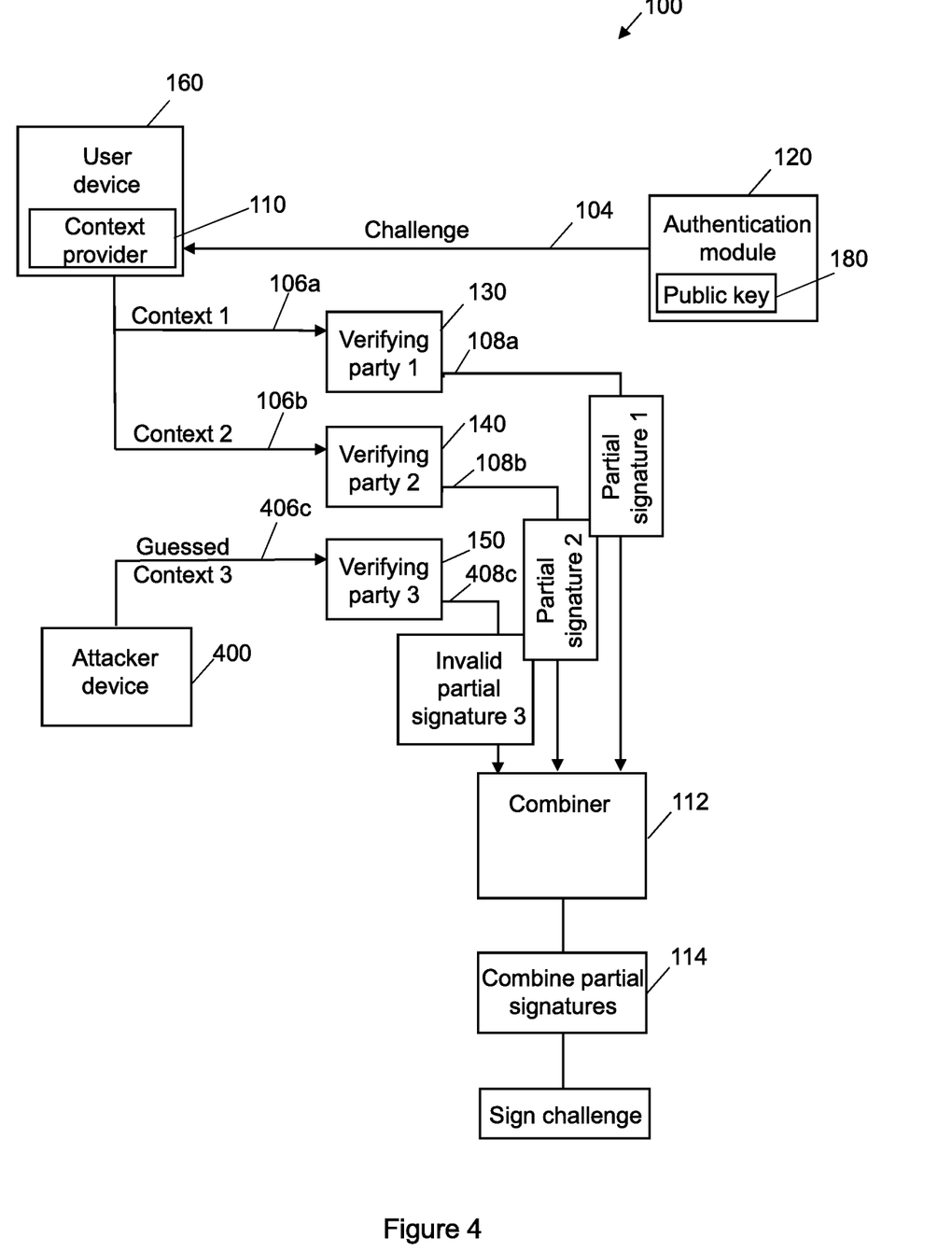
FIG. 4 shows a schematic representation of a contextual authorisation system receiving an attack according to an example of the disclosure.

FIG. 4 shows a schematic representation of a contextual authorisation system receiving an attack according to an example of the disclosure. Features in common with the examples discussed above will not be discussed in detail again. In this example, the verifying party 150 receives a context not from the context provider, but from an attacker device 400 attempting to gain access requested by the user (i.e. the attacker 400 is attempting to compromise the privacy of the contextual authentication data of the user 160).

The attacker 400 provides a guessed context 406c of the user (e.g. the attacker 400 could send a guess of the user's geolocation data to a geolocation verifying service 150, and observe if the geolocation verifying service 150 emits a partial signature as a result).

The verifying party 150 may determine that the guessed context is not as expected, and in some examples, as a result, provide an alert of attempted attack, or provide nothing since the provided context 406c does not match what is expected for the requesting user. However, in this example, the verifying party 150 receiving the guessed context 406c, based on the received contextual identifier not matching an associated stored user context, provides an invalid corresponding partial response 408c to the combiner module 112. The invalid response may be indistinguishable to an outside party (e.g. to the attacker 400) from a valid response (which would be provided in the event of the context matching what is expected for the user). That is, if the verifying party 150 emits a partial signature, it means the attacker 400 may be able to verify that the guess 406c is correct, and thereby discover privacy-sensitive data about the user 160. Thus, by making the behaviour of the verifying parties 130, 140, 150 look identical for a user other than the requesting user 160 whether the context is usual or not, it is more difficult for the attacker 400 to know if their guess was correct or not (and thus harder for the attacker 400 to obtain contextual information of the user). The combiner would have access to the information which is provided, as it would know that the combination has failed. The verifying party 150 may, if the provided context is unusual, emit an invalid partial signature (e.g. random data) instead of a valid one, and send it back to the combiner 112. The combiner 112 may verify each partial signature 108a, 108b, 408c with a corresponding verification key in some examples, or may try to combine the partial signatures and see if the result fails in some examples.

Figure 5:
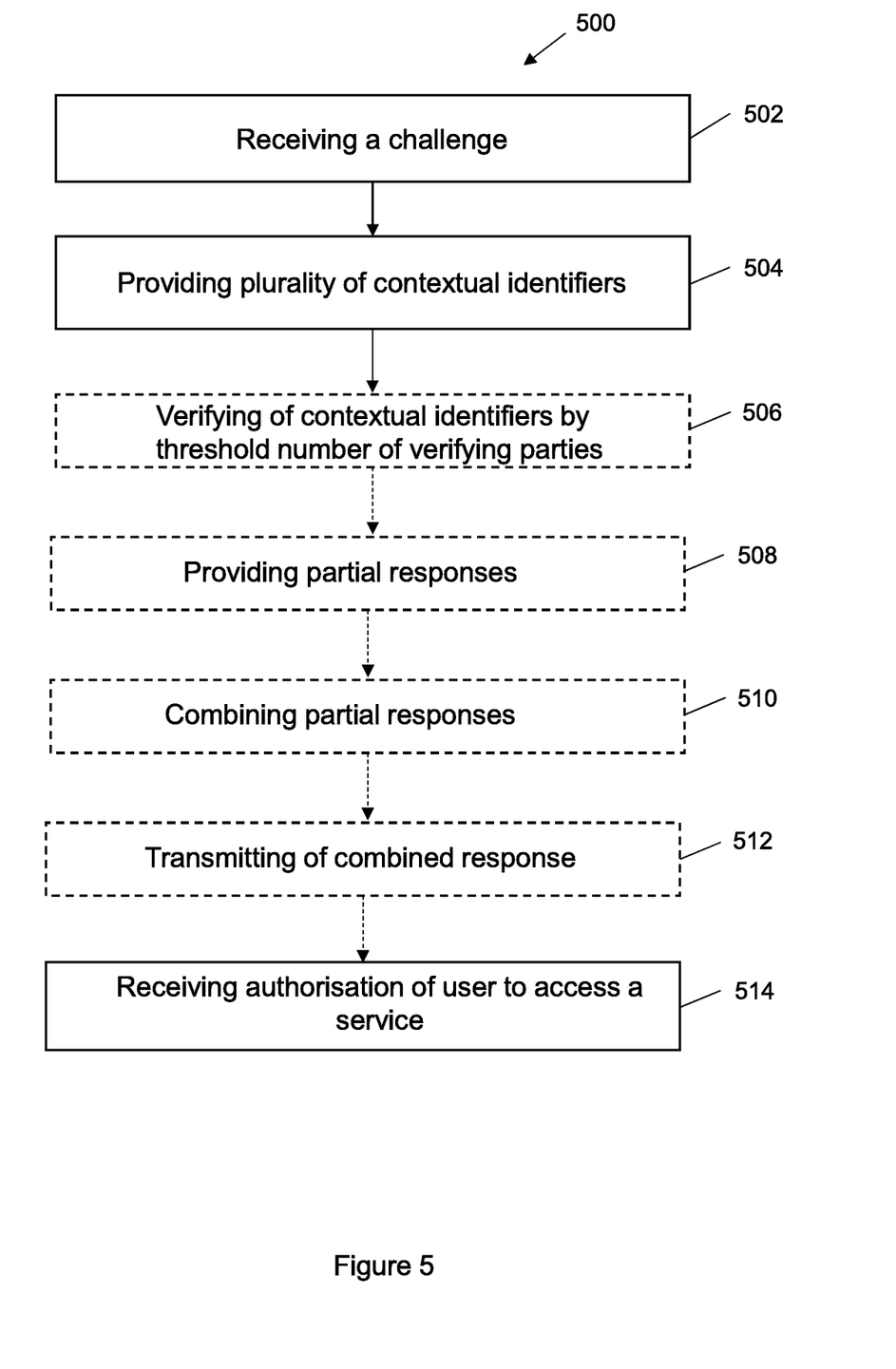
FIGS. 5 to 7 show example methods according to examples of the disclosure.

FIG. 5 shows an example computer-implemented method 500 according to examples of the disclosure. The method 500 comprises: receiving a challenge from a relying party seeking to authenticate a user 502; providing a plurality of contextual identifiers of the user to corresponding verifying parties of a set of verifying parties 504; and, based on verification of the provided contextual identifiers by a threshold number of the corresponding verifying parties, provision of a partial response upon verification by each verifying party for combination, combination of the partial responses to obtain a response, and transmission of the response to the relying party, and receipt of the response by the relying party: receiving, from the relying party, authorisation of the user to access a service as an authorised user 514. Such a method 500 may be carried out in a user device, for example.

In some examples, providing the plurality of contextual identifiers of the user to corresponding verifying parties of the set of verifying parties 504 may comprise: providing the plurality of different contextual identifiers to each of the set of verifying parties for selection of a corresponding contextual identifier for verification by each respective verifying party of the set of verifying parties; or selecting corresponding contextual identifiers of the plurality of different contextual identifiers based on the verifying parties of the set of verifying parties; and providing each selected corresponding contextual identifier to the corresponding verifying party of the set of verifying parties for verification.

In some examples, such a method may comprise selecting a combination of the set of verifying parties from which a plurality of partial signatures may be combined to obtain the combined signature, based on which the private key shares are distributed. This may be done by the user device, for example.

In some examples, the method 500 may comprise verifying, by the verifying parties, the provided contextual identifier by a threshold number of verifying parties 506; and generating/providing, by the verifying parties, the partial responses 508 by each using a share of a distributed private key to generate a partial signature; wherein the distributed private key is paired with a public key available at the relying party. In some examples, the method 500 may comprise receiving the partial signatures provided by the threshold number of corresponding verifying parties; combining the received partial signatures 510 to obtain a combined signature and signing the response with the combined signature; and providing the signed response to the relying party 512. Such a method may take place at a combiner, for example.

Figure 6:
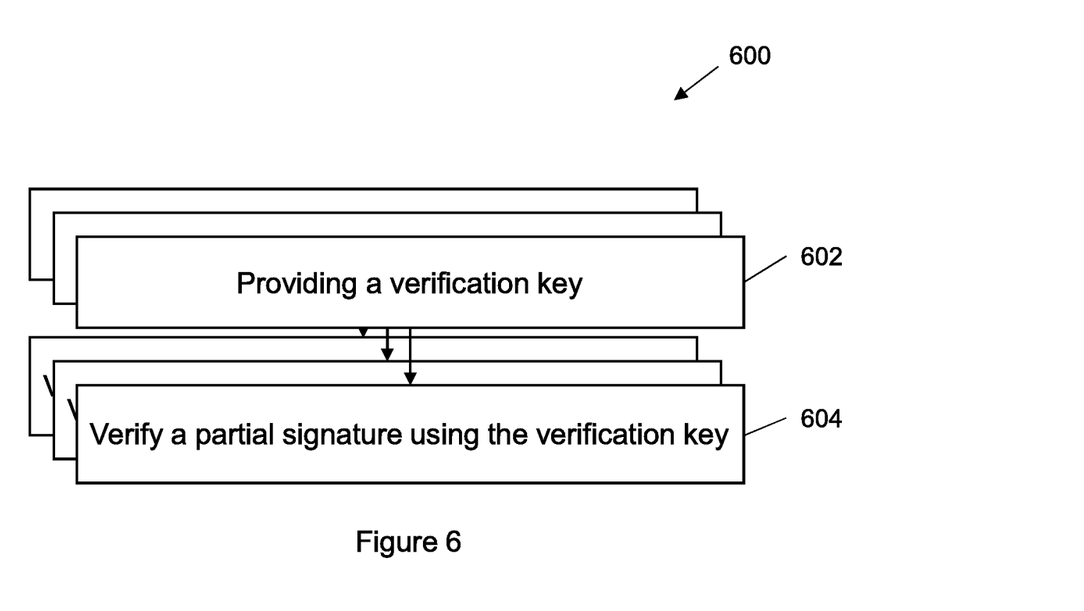

In some examples, verification keys corresponding to each share of the response-providing information allocated to a verifying party (e.g. each partial signature) may be distributed to the verifying parties. FIG. 6 shows a computer-implemented method 600 comprising providing a plurality of verification keys 620, wherein each of the plurality of verification keys corresponds to a share of the distributed private key; and verifying the partial signatures provided by the verifying parties using the plurality of verification keys 604.

Figure 7:
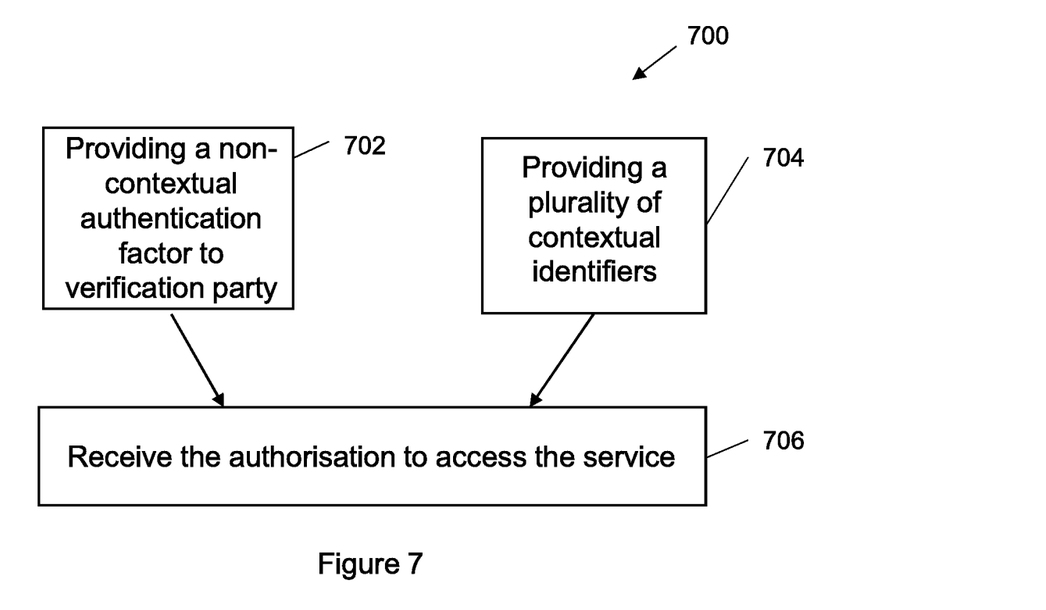

FIG. 7 shows an example of an extension of the computer-implemented method of FIG. 5, employing multi-factor authentication of the user. The method 700 comprises, alongside the contextual identification discussed above, providing a non-contextual authentication factor to a corresponding non-contextual verification party 702 (the non-contextual authentication factor and the plurality of contextual identifiers 704 being provided according to a multi-factor authentication policy); and based on provision of a non-contextual response upon verification of the further non-contextual authentication factor by the corresponding non-contextual verification party, and transmission of the non-contextual response to the relying party (alongside the validly signed challenge obtained through contextual verification) receiving, from the relying party, the authorisation of the user to access the service as an authorised user 706.

Also disclosed herein is a non-transitory computer readable storage medium having executable instructions stored thereon, which, when executed by a processor, cause the processor to: transmit a request to a service provider for access to a service; receive a challenge from a relying party seeking to authenticate the user; transmit a plurality of contextual identifiers of the user, to respective verifying parties of a plurality of verifying parties; receive a plurality of partial responses from the verifying parties upon verification by the verifying parties of the received contextual identifiers; determine that the number of received partial responses meets a threshold number of responses; combine the received partial responses to obtain a combined response; and transmit, to the relying party, the combined response to obtain authorisation of the user device to access the requested service. In other examples, the non-transitory computer-readable storage medium may comprise program code to perform any of the methods discussed herein. An example non-transitory computer-readable storage medium 804 is illustrated in FIG. 8.

Figure 8:
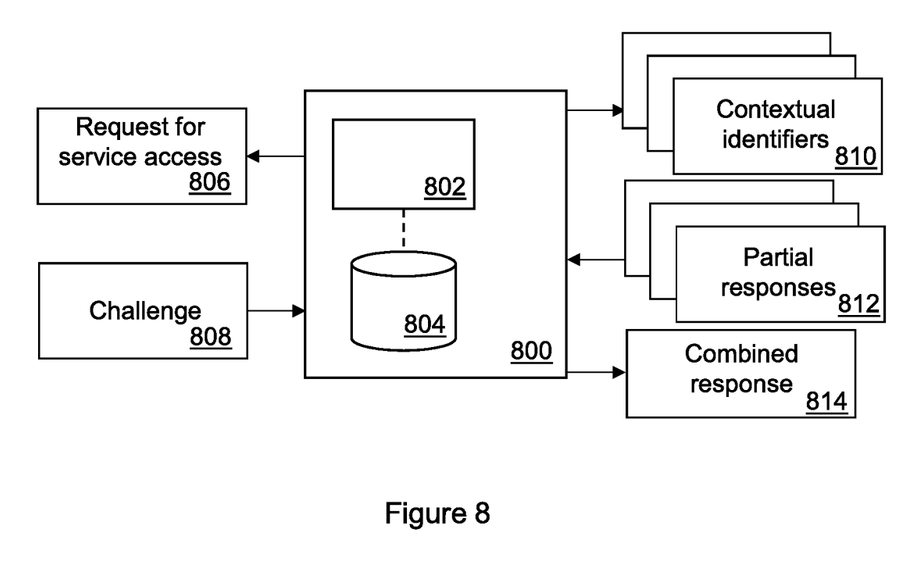
FIG. 8 shows an example apparatus comprising a processor and memory according to examples of the disclosure.

FIG. 8 shows an example apparatus 800 comprising a processor 802 and memory 804 according to examples of the disclosure. Such an apparatus 800 may be a user device which also acts as a combiner, for example. In this example, the apparatus 800 provides a request for access to a service 806 (to an authentication module), and receives a challenge in 808 response. The apparatus 800 provides contextual identifiers 810 (to respective verification parties); once verified, receives the corresponding partial responses 812, and combines them to provide a combined response 814 for use in signing the challenge 808 and authenticating itself to an authentication party.

Of course, such an apparatus 800 may be, in other examples, a user device separate from a combiner; a verification party or verification device/server providing a software-based verification service; an authentication module, or a combiner.

In examples above, from the point of view of the authentication module or a relying party, authentication may be as for normal public key authentication using digital signatures. Contextual authentication capability is thus not necessarily dependant on the relying party implementing any particular contextual verification scheme, and examples discussed above may be deployed to any authentication module or a relying party that implements public key-based authentication. Examples discussed herein may be implemented as extensions to a Multi-Device based authentication system (e.g. where a user requires access to, for example, a laptop computer and a smartphone), where additional context authentication could be used for user authentication.

Examples discussed herein may provide improved privacy to the user as well as strong authentication. Examples may be considered to be privacy-preserving in the sense that no single party needs to be trusted with all the user information, and that the authentication module/relying party does not learn anything more than necessary to authenticate the user. Moreover, the third party doesn't need to know or learn the contextual authentication policy, or even if contextual information was used for authentication at all.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The following numbered paragraphs also form a part of this disclosure:

1. A system, comprising: an authentication module to: generate a challenge to authenticate a user, the challenge to be distributed to members of a set of verifying parties; and grant the user access to a resource upon receiving an authenticating response to the challenge; and a combiner module to: receive partial responses from members of the set of verifying parties upon verification of the user by each member, the verification made using a provided contextual identifier of the user; based on the partial responses reaching a threshold number of responses, combine the partial responses to obtain a combined response; and provide the combined response to the authentication module as an authenticating response to the challenge.

2. The system of paragraph 1, comprising: a key distribution module to: generate a paired public key and private key in association with a user, split the private key into a set of shares, and distribute members of the set of shares to the set of verification parties, wherein a share is to be used by a verification party to generate the partial response upon verification of the user by the verifying party using the received contextual identifier.

3. The system of paragraph 1 or paragraph 2, wherein the combined response is a message that would be produced by signing the challenge with a distributed private key.

4. The system of any of paragraphs 1 to 3, wherein the contextual identifiers comprise one or more of: a hardware token identifier, a user device hardware identifier; a user device geolocation; a spoofable user identifier, and a user device IP address.

5. The system of any of paragraphs 1 to 4, comprising: the set of verifying parties to: receive the challenge; each compare the contextual identifier received with a corresponding stored context of the user; and based on the received contextual identifier matching an associated stored user context, each provide the corresponding partial response to the combiner module.

6. The system of paragraph 5, wherein a verifying party of the set of verifying parties is to: based on the received contextual identifier not matching an associated stored user context, provide an invalid corresponding partial response to the combiner module.

7. The system of paragraph 5 or paragraph 6, wherein the set of verifying parties are separate from the authentication module.

8. A computer-implemented method comprising: receiving a challenge from a relying party seeking to authenticate a user; providing a plurality of contextual identifiers of the user to corresponding verifying parties of a set of verifying parties; and based on verification of the provided contextual identifiers by a threshold number of the corresponding verifying parties, provision of a partial response upon verification by each verifying party for combination, combination of the partial responses to obtain a response, and transmission of the response to the relying party, and receipt of the response by the relying party: receiving, from the relying party, authorisation of the user to access a service as an authorised user.

9. The method of paragraph claim 8, comprising: verifying, by the verifying parties, the provided contextual identifier; and generating, by the verifying parties, the partial responses by each using a share of a distributed private key to generate a partial signature; wherein the distributed private key is paired with a public key available at the relying party.

10. The method of paragraph 9, comprising: receiving the partial signatures provided by the threshold number of corresponding verifying parties; combining the received partial signatures to obtain a combined signature and signing the response with the combined signature; and providing the signed response to the relying party.

11. The method of paragraph 9 or paragraph 10, comprising: selecting a combination of the set of verifying parties from which a plurality of partial signatures may be combined to obtain the combined signature, based on which the private key shares are distributed.

12. The method of any of paragraphs 9 to 11, comprising: providing a plurality of verification keys, wherein each of the plurality of verification keys corresponds to a share of the distributed private key; and verifying the partial signatures provided by the verifying parties using the plurality of verification keys.

13. The method of any of paragraphs 8 to 12, comprising: providing a non-contextual authentication factor to a corresponding non-contextual verification party, the non-contextual authentication factor and the plurality of contextual identifiers provided according to a multi-factor authentication policy; and based on provision of a non-contextual response upon verification of the further non-contextual authentication factor by the corresponding non-contextual verification party, and transmission of the non-contextual response to the relying party: receiving, from the relying party, the authorisation of the user to access the service as an authorised user.

14. The method of any of paragraphs 8 to 13, wherein providing the plurality of contextual identifiers of the user to corresponding verifying parties of the set of verifying parties comprises: providing the plurality of different contextual identifiers to each of the set of verifying parties for selection of a corresponding contextual identifier for verification by each respective verifying party of the set of verifying parties; or selecting corresponding contextual identifiers of the plurality of different contextual identifiers based on the verifying parties of the set of verifying parties; and providing each selected corresponding contextual identifier to the corresponding verifying party of the set of verifying parties for verification.

15. A non-transitory computer readable storage medium having executable instructions stored thereon, which, when executed by a processor, cause the processor to: transmit a request to a service provider for access to a service; receive a challenge from a relying party seeking to authenticate the user; transmit a plurality of contextual identifiers of the user, to respective verifying parties of a plurality of verifying parties; receive a plurality of a partial responses from the verifying parties upon verification by the verifying parties of the received contextual identifiers; determine that the number of received partial responses meets a threshold number of responses; combine the received partial responses to obtain a combined response; and transmit, to the relying party, the combined response to obtain authorisation of the user device to access the requested service.

The invention claimed is:

1. A system, comprising:
   an authentication module to:
     generate a challenge to authenticate a user, the challenge to be distributed to members of a set of verifying parties, and
     grant the user access to a resource upon receiving an authenticating response to the challenge; and
   a combiner module to:
     receive partial responses from members of the set of verifying parties upon verification of the user by each member, the verification made using a provided contextual identifier of the user,
     based on the partial responses reaching a threshold number of responses, combine the partial responses to obtain a combined response, and
     provide the combined response to the authentication module as an authenticating response to the challenge.

2. The system of claim 1, comprising:
   a key distribution module to:
     generate a paired public key and private key in association with a user,
     split the private key into a set of shares, and
     distribute members of the set of shares to the set of verifying parties, wherein a share is to be used by a verifying party to generate the partial response upon verification of the user by the verifying party using the received contextual identifier.

3. The system of claim 2, wherein the combined response is a message that would be produced by signing the challenge with the distributed private key.

4. The system of claim 1, wherein the contextual identifiers comprise one or more of:

a hardware token identifier, a user device hardware identifier; a user device geolocation;
a spoofable user identifier, and a user device IP address.

5. The system of claim 1, comprising:
the set of verifying parties to:
receive the challenge;
each compare the contextual identifier received with a corresponding stored context of the user; and
based on the received contextual identifier matching an associated stored user context, each provide the corresponding partial response to the combiner module.

6. The system of claim 5, wherein a verifying party of the set of verifying parties is to:
based on the received contextual identifier not matching an associated stored user context, provide an invalid corresponding partial response to the combiner module.

7. The system of claim 5, wherein the set of verifying parties are separate from the authentication module.

8. A computer-implemented method comprising:
receiving a challenge from a relying party seeking to authenticate a user;
providing a plurality of contextual identifiers of the user to corresponding verifying parties of a set of verifying parties; and
based on verification of the provided contextual identifiers by a threshold number of the corresponding verifying parties, provision of a partial response upon verification by each verifying party for combination, combination of the partial responses to obtain a response, and transmission of the response to the relying party, and receipt of the response by the relying party:
receiving, from the relying party, authorisation of the user to access a service as an authorised user.

9. The method of claim 8, comprising:
verifying, by the verifying parties, the provided contextual identifier; and
generating, by the verifying parties, the partial responses by each using a share of a distributed private key to generate a partial signature;
wherein the distributed private key is paired with a public key available at the relying party.

10. The method of claim 9, comprising:
receiving the partial signatures provided by the threshold number of corresponding verifying parties;
combining the received partial signatures to obtain a combined signature and signing the response with the combined signature; and
providing the signed response to the relying party.

11. The method of claim 9, comprising:
selecting a combination of the set of verifying parties from which a plurality of partial signatures may be combined to obtain the combined signature, based on which the private key shares are distributed.

12. The method of claim 9, comprising:
providing a plurality of verification keys, wherein each of the plurality of verification keys corresponds to a share of the distributed private key; and
verifying the partial signatures provided by the verifying parties using the plurality of verification keys.

13. The method of claim 8, comprising:
providing a non-contextual authentication factor to a corresponding non-contextual verifying party, the non-contextual authentication factor and the plurality of contextual identifiers provided according to a multi-factor authentication policy; and
based on provision of a non-contextual response upon verification of the further non-contextual authentication factor by the corresponding non-contextual verifying party, and transmission of the non-contextual response to the relying party:
receiving, from the relying party, the authorisation of the user to access the service as an authorised user.

14. The method of claim 8, wherein providing the plurality of contextual identifiers of the user to corresponding verifying parties of the set of verifying parties comprises:
providing the plurality of different contextual identifiers to each of the set of verifying parties for selection of a corresponding contextual identifier for verification by each respective verifying party of the set of verifying parties; or
selecting corresponding contextual identifiers of the plurality of different contextual identifiers based on the verifying parties of the set of verifying parties; and
providing each selected corresponding contextual identifier to the corresponding verifying party of the set of verifying parties for verification.

15. A non-transitory computer readable storage medium having executable instructions stored thereon, which, when executed by a processor, cause the processor to:
transmit a request to a service provider for access to a service;
receive a challenge from a relying party seeking to authenticate the user;
transmit a plurality of contextual identifiers of the user, to respective verifying parties of a plurality of verifying parties;
receive a plurality of a partial responses from the verifying parties upon verification by the verifying parties of the received contextual identifiers;
determine that the number of received partial responses meets a threshold number of responses;
combine the received partial responses to obtain a combined response; and
transmit, to the relying party, the combined response to obtain authorisation of the user device to access the requested service.

* * * * *